(12) United States Patent
Lindner et al.

(10) Patent No.: US 12,443,614 B2
(45) Date of Patent: Oct. 14, 2025

(54) EFFICIENT COLUMN DETECTION USING SEQUENCING, AND APPLICATIONS THEREOF

(71) Applicant: VEDA Data Solutions, Inc., Washington, DC (US)

(72) Inventors: Robert Raymond Lindner, Fitchburg, WI (US); Carlos Vera-Ciro, Madison, WI (US)

(73) Assignee: VEDA Data Solutions, Inc., Madison, WI (US)

( * ) Notice: Subject to any disclaimer, the term of this patent is extended or adjusted under 35 U.S.C. 154(b) by 0 days.

(21) Appl. No.: 18/114,075

(22) Filed: Feb. 24, 2023

(65) Prior Publication Data

US 2023/0273934 A1    Aug. 31, 2023

Related U.S. Application Data

(60) Provisional application No. 63/268,539, filed on Feb. 25, 2022.

(51) Int. Cl.
*G06F 16/248* (2019.01)
*G06F 16/22* (2019.01)

(52) U.S. Cl.
CPC ........ *G06F 16/248* (2019.01); *G06F 16/2237* (2019.01)

(58) Field of Classification Search
None
See application file for complete search history.

(56) References Cited

U.S. PATENT DOCUMENTS

| | | | |
|---|---|---|---|
| 2012/0166927 A1* | 6/2012 | Shearer | G06F 40/18 715/212 |
| 2013/0124960 A1 | 5/2013 | Velingkar et al. | |
| 2016/0103863 A1* | 4/2016 | Becker | G06F 16/211 707/741 |
| 2017/0060919 A1* | 3/2017 | Ramachandran | G06F 16/258 |
| 2018/0060418 A1 | 3/2018 | Robichaud | |
| 2019/0311299 A1 | 10/2019 | Lindner | |
| 2019/0392075 A1 | 12/2019 | Han et al. | |
| 2020/0321113 A1* | 10/2020 | Neumann | G06N 20/00 |
| 2021/0174380 A1 | 6/2021 | Vera-Ciro et al. | |
| 2022/0309390 A1* | 9/2022 | Arnautov | G06N 5/01 |

OTHER PUBLICATIONS

International Search Report and Written Opinion directed to related International Application No. PCT/US2023/063200, mailed Jun. 7, 2023; 6 pages.

* cited by examiner

*Primary Examiner* — Dawaune A Conyers
(74) *Attorney, Agent, or Firm* — Sterne, Kessler, Goldstein & Fox, P.L.L.C.

(57) ABSTRACT

The present disclosure is directed to systems and methods for identifying demographic information in a data file. The method uses evidence for a label within the column itself. In addition, the method uses likelihoods that a first label may exist at a particular location in a data file with respect to a second label. Finally, the method uses likelihoods that a first label exists in the data file at a first frequency given that a second label exists in a data file in a second frequency. All based on these likelihoods, an overall likelihood of that the label configuration is correct is determined. Using that likelihood score, a nonlinear optimization algorithm is applied to identify a best fit between a group of labels and a group of columns in a data file.

18 Claims, 5 Drawing Sheets

EFFICIENT COLUMN DETECTION USING SEQUENCING, AND APPLICATIONS THEREOF

CROSS-REFERENCE TO RELATED APPLICATION

This application claims priority to U.S. Provisional Application No. 63/268,539, filed on Feb. 25, 2022, the contents of which is incorporated by reference herein in its entirety.

FIELD

This field is generally related to processing information.

BACKGROUND

As technology advances, more demographic information is becoming digitized. For example, for healthcare providers, demographic information may include, but is not limited to, their name, address, specialties, academic credentials, certifications, and the like.

Entities may need to maintain demographic information. For example, health insurance companies may need to maintain demographic information about healthcare providers that need to be reimbursed for claimed services. To maintain the demographic information, these entities often attempt to collect and integrate the demographic information from providers, hospitals, group practices, or the like.

Often responses to requests for this information have poor response rates, are poorly formatted, and include inaccurate information. For example, the responses may be structured in an unknown format, may include inconsistent or mislabeled headings or may include spurious information. As such, the responses should be reviewed to verify the contents of the data provided and reformatted into a consistent structure. However, the responses frequently include hundreds, if not thousands, of entries with any number of different types of demographic data. Consequently, manually reviewing and reformatting data from these responses may be difficult, time-consuming, and expensive, and often takes weeks per file to complete. These costs and time delays significantly contribute to the administrative overhead costs that account for about one third of healthcare premiums in the United States.

Thus, systems and methods are needed to improve reviewing and reformatting these responses into a validated format by automating expensive administrative tasks, thereby eliminating manual data formatting and reducing wasteful spending.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
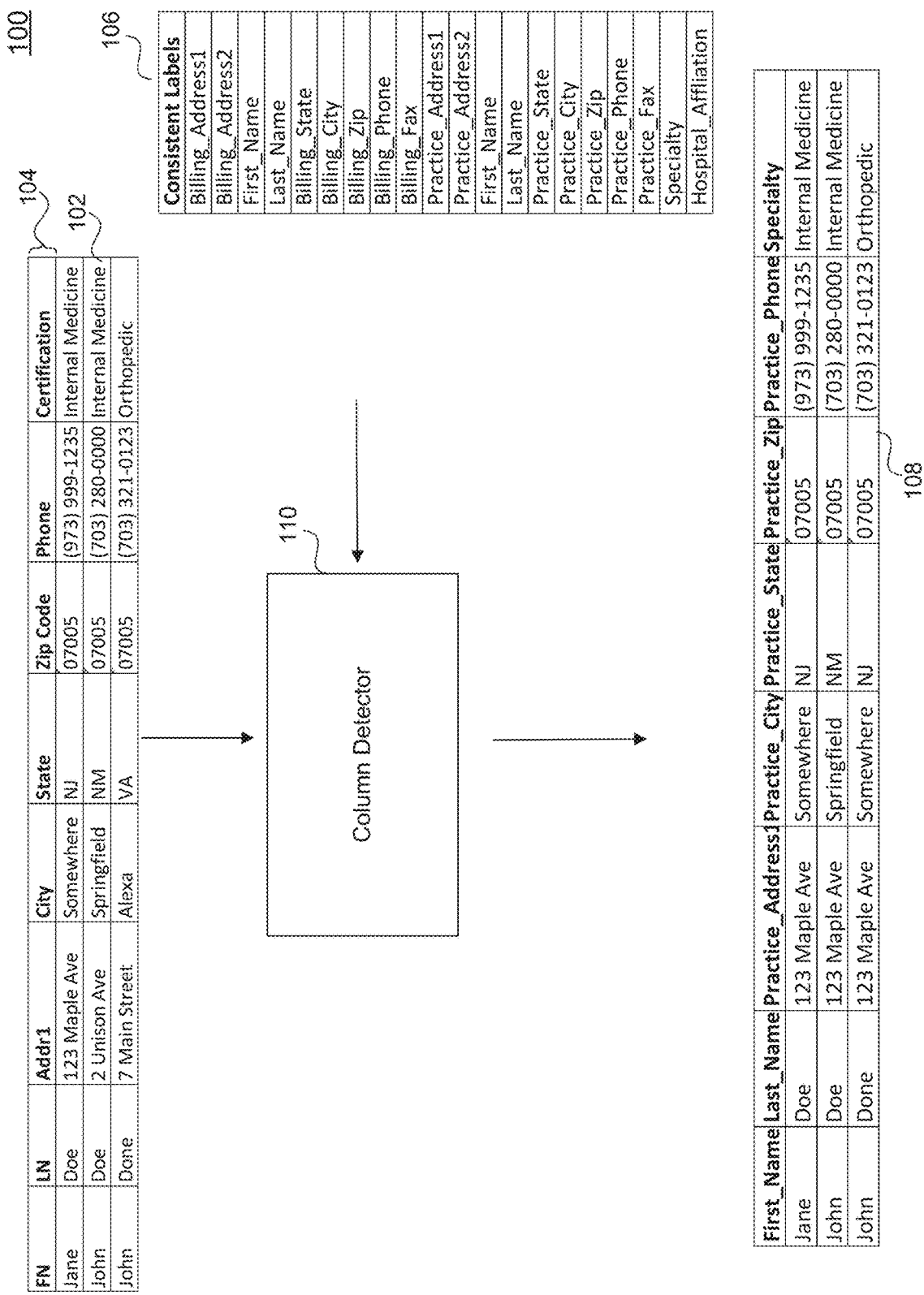
FIG. 1 illustrates an example operation of a system for detecting column labels of a data file.

Embodiments provide ways to review and reformat data files that include inconsistent or mislabeled nomenclatures for one or more fields of a plurality of fields of demographic information or spurious demographic information, which may require weeks per file to review and reformat manually.

The present disclosure is directed to systems and methods for identifying demographic information in a data file. The method uses evidence for a label within the column itself. In addition, the method uses likelihoods that a first label may exist at a particular location in a data file with respect to a second label. Finally, the method uses likelihoods that a first label exists in the data file at a first frequency given that a second label exists in a data file in a second frequency. All based on these likelihoods, an overall likelihood of whether the label configuration is correct is determined. Using that likelihood score, a nonlinear optimization algorithm is applied to identify a best fit between a group of labels and a group of columns in a data file.

To seed the optimization algorithm (and thus improve its performance), embodiments may analyze the data file using a machine learning model trained according to other data files to distinguish between each of the plurality of fields of demographic information. The machine learning model may be based on a plurality of machine learning algorithms to identify different types of demographic information. For example, analyzing the data file may be based on a combination of one or more of semantic content of the demographic information, a shape of the demographic information, or metadata. In this way, embodiments provide the ability to identify different types of demographic data. Embodiments may also generate a score indicating a probability that each of the plurality of fields of demographic information was identified correctly. Embodiments may also generate a revised data file labeling each of the plurality of fields of demographic information based on the identified type. For example, the revised data file may be formatted based on the requirements of the third-party that provided the original data file. In other words, the revised data file may be fully customizable based on individual requests for the restructured data. Thus, embodiments provide the ability to effectively and efficiently generate data files in a format that is most useful to the third party.

Furthermore, the present disclosure may implement a combination of a plurality of machine learning algorithms and rules, which improve the functionality of the computing device. Namely, the combination of machine learning algorithms and rules avoids overtraining, and thus overcomplicating, the machine learning model, thereby reducing the amount of resources, e.g., processing consumption and memory resources, required to generate reformatted data files. Additionally, in some aspects, the present disclosure may intelligently identify different types of demographic information based on a sampled portion of the data file, rather than the entire data file, which may include hundreds, if not thousands of entries. By identifying the different types of demographic information based on a sampled portion, the present disclosure may further reduce the amount of resources required to generate reformatted data files.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 illustrates a diagram 100 with an example operation of a system for detecting column labels of a data file.

Diagram 100 illustrates an input data file 102. Data file 102 may be of demographic information of one or more individuals, such as healthcare providers, including but not limited to, doctors, dentists, physician assistants, nurse practitioners, nurses, or the like. Although the present disclosure describes the individuals as being healthcare providers, it should be understood by those of ordinary skill in the arts that the present disclosure may be implemented accumulating data from any data source.

Data file 102 may be a response to a request for demographic information from, for example, medical practice groups, hospitals, or the like. This information may be entered by an administrator, and as such, the data file may include inconsistent or mislabeled nomenclatures for one or more fields of a plurality of fields of demographic information or it may include spurious demographic information. These different entities may utilize different nomenclatures for one or more fields of the plurality of fields.

In some embodiments, data file 102 may include a table of information having any number of headings labeling a plurality of fields of demographic information. For example, as illustrated in FIG. 1, the data file may include a table having the headings 104, each labeling a column of information. Each entry, in this example a record representing a health care practitioner, may be represented by a row in the table in data file 102. And each row may have a plurality of data fields, one for each column. In the example in FIG. 1, data file 102 has columns labeled "FN", "LN", "Addr1", "City", "State", "Zip Code", "Phone", and "Certification".

The labels for columns 104 in data file 102 may not match consistent labels 106. Consistent labels 106 may represent a set of internal labels that a system may want to apply to data from a variety of different sources, each labeling their data in a different manner. By applying consistent labels 106 to columns of data files from a plurality of different sources, a system can normalize data from a number of different sources, allowing for another, receiving entity, such as a health insurance company, to treat the information consistently.

Column detector 110 is configured to match the various columns in input data files 102 with consistent labels 106. How column detector 110 can match columns with consistent labels 106 is described in detail with respect to FIG. 2.

Figure 2:
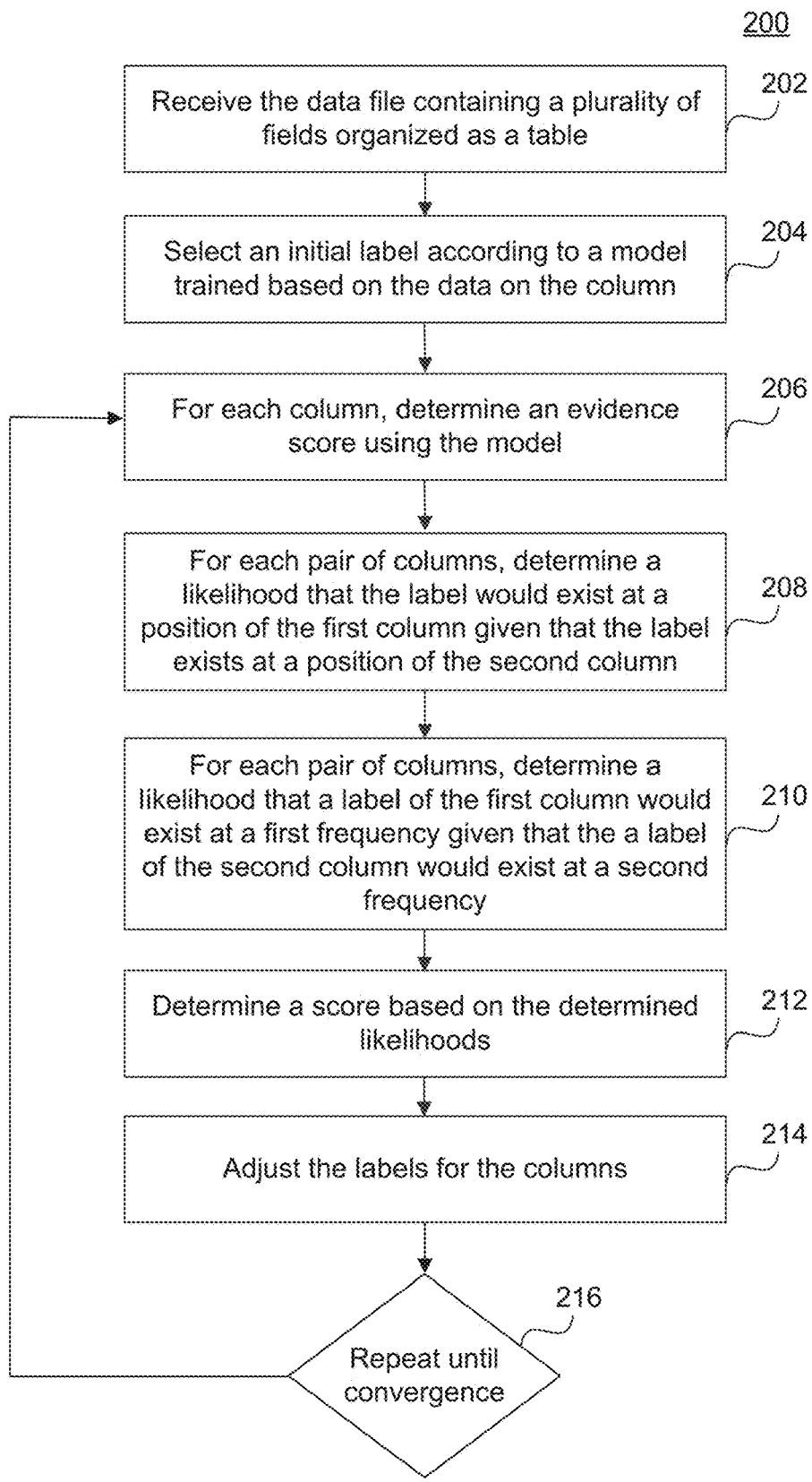
FIG. 2 is a flowchart illustrating a method for reviewing and reformatting data files from the one or more data sources, according to aspects of the present disclosure.

FIG. 2 is a flowchart illustrating a method for reviewing and reformatting data files from the one or more data sources, according to aspects of the present disclosure.

At step 202, column detector 110 receives a data file, such as data file 102 in FIG. 1. As described above, the data file includes a plurality of fields organized as a table with a plurality of columns and a plurality of rows. The data file may have unknown or inconsistent labeling for the columns.

At step 204, column detector 110 selects, from a plurality of consistent labels, an initial label for each column in the data file. In some embodiments, column detector 110 may analyze data file 102 using a machine learning model trained according to other data files to distinguish between each of the plurality of fields of demographic information. The machine learning model may be trained using a number of Monte Carlo training sets having sample data files. That is, the model trainer may use a sample set generated by humans identifying demographic information in a data file. In some embodiments, the machine learning model may be based on a plurality of machine learning algorithms to identify different types of demographic information. In some embodiments, the plurality of machine learning algorithms may be supervised machine learning algorithms including, but are not limited to, support vector machines, linear regression, logistic regression, naive Bayes, linear discriminant analysis, decision trees, k-nearest neighbor algorithm, neural networks, and similarity learning. It should be understood by those of ordinary skill in the art that these are merely example supervised machine learning algorithms and that other supervised machine learning algorithms may be used in accordance with aspects of the present disclosure.

In some embodiments, the machine learning model may also be trained on respective rules for common types of demographic information. For example, the rules may include a rule that a five digit number or a five digit number followed by a hyphen and another four digit number is a zip code, as these are the only available formats for zip codes. As another example, an NPI may be formatted as a ten digit number with the first digit being a "1," and as such, the rules may include a rule indicating that any ten digit number commencing with a "1" is an NPI. In a further example, the rules may include a rule for determining responses to binary pieces of demographic information, e.g., whether a healthcare provider is accepting new patients—"Yes"/"Y" or "No"/"N." By using rules for common types of demographic information, the present disclosure avoids overtraining, and thus overcomplicating, the machine learning model and also improves efficiency of the machine learning model. In some embodiments, these rules may be defined as regular expressions, however it should be understood by those of ordinary skill in the arts that other types of rules may be used.

As one example, the column detector 110 may analyze the data file by analyzing semantic content of each of the plurality of fields of demographic information to identify the different types of demographic information. For example, the column detector 110 may identify semantic content, such as a state name or state abbreviation, which indicates that the demographic information is likely an address, rather than, for example, a phone number or facsimile number. Similarly, the column detector 110 may identify semantic content, such as street names (e.g., Avenue, Road, Street, Lane, etc.) and/or their associated abbreviations (e.g., Ave., Rd. St. Ln., etc.), which would likewise also indicate that the demographic information is an address. Even further, the column detector 110 may identify semantic content, such as state names (or country names) and/or their associated abbreviations, which would likewise also indicate that the demographic information is an address. In some embodiments, the column detector 110 may also be able to identify a billing address based on the semantic content. For example, the semantic content may include, for example, a PO Box number, which would indicate that the content is a billing address, rather than a service address. In yet another example, the column detector 110 may identify the semantic content, such as a hyperlink, which may indicate that the demographic information is an email address. It should be understood by those of ordinary skill in the arts that these are merely examples of semantic content that may be identified, and that other types of semantic content are contemplated in accordance with aspects of the present disclosure.

As another example, the column detector 110 may analyze the data file by analyzing a shape of each of the plurality of fields of demographic information to identify the different types of demographic information. For example, the column detector 110 may analyze the demographic information to identify the number of characters, the type of the characters (e.g., numeric versus letter characters), the number of non-alphanumeric characters (e.g., spaces, commas, periods, or the like), and an overall arrange of the alphanumeric characters and non-alphanumeric characters. For example, the shape of the demographic information may be "XXX[comma][space]XXX" or "XXX[comma][space]XXX [space]X [period]", with each X representing a letter character, which are common formats identifying names. In another example, the shape of the demographic information may be ###XXX [space]XXX [space]XXX[comma]XX[space] #####(or #####-####), with each #representing a numeric character and each X representing a letter character, which is a common format of an address. However, some data files may use a full state name, rather than the two letter abbreviation for the state, and as such, the column detector 110 may identify the state within an address based on the semantic content, as discussed herein. In yet another example, the column detector 110 may identify the shape of the demographic information, such as XXX@XXX[period]XXXX, which indicates that the demographic information is an email address. It should be understood by those of ordinary skill in the arts that these are merely examples of shapes of demographic content that may be identified, and that other types of shapes of demographic content are contemplated in accordance with aspects of the present disclosure.

As yet another example, the column detector 110 may analyze the data file by analyzing metadata of each of the plurality of fields of demographic information to identify the different types of demographic information. For example, the metadata may include each nomenclature of the headings. In some instances, the semantic content and shapes of the demographic information may be similar. For example, phone numbers and facsimile numbers may have similar semantic content and shapes. In another example, service addresses and billing addresses may have similar semantic content and shapes. To differentiate between demographic information having similar semantic content and shapes, the column detector 110 may analyze the metadata of the headings (or subheadings). For example, the column detector 110 may identify common nomenclatures used for the different types of demographic information. For example, common nomenclatures for phone numbers may include, but are not limited to, "Phone No.," "Phone Number," "P:," "PH No.," or the like, whereas common nomenclatures for facsimile numbers may include, but are not limited to, "Fax No.," "Fax Number," "F:," "FX No.," or the like. Likewise, common nomenclatures for service addresses may include the terms, for example, "Service," "Serv.," or the like, or the service address may be listed only as "Address" or some variation thereof, whereas the billing address may be specifically identified as such.

The column detector 110 may also generate a score indicating a probability that each of the plurality of fields of demographic information was identified correctly. For example, the column detector 110 may generate a baseline score for each of the plurality of fields of demographic information, which may then be adjusted. For example, the column detector 110 may increase the scores for demographic information having well-known semantic content and/or shapes, e.g., zip codes and NPIs. Additionally, the column detector 110 may increase or decrease the score based on whether the heading correctly identifies the associated demographic information, e.g., whether the heading correctly identifies "NPIs." For example, the score may be decreased when the heading and the content do not match, whereas the score may be increased when the heading and content match. In some embodiments, column detector 110 may increase the score based on whether demographic information having similar semantic content and/or shapes have been detected. For example, the column detector 110 increases the score for a telephone number or address if only a single piece of demographic information having the given semantic content and/or shape is identified. However, in the event two or more identified fields of demographic information having the same semantic content and/or shape are identified (e.g., a phone number and a facsimile number or a service address and a billing address), the column detector 110 may decrease the score for both of the two or more identified fields of demographic information, and these identified fields may have the same score. Furthermore, in some situations, the column detector 110 may generate an alert notifying an administrator of the two or more identified fields of demographic information having the same semantic content and/or shape, such that the administrator may provide input to resolve the conflict.

To resolve this, column detector 110 may apply additional processing to distinguish between the two or more identified fields of demographic information. For example, in some embodiments, column detector 110 may cross-check at least one of the plurality of fields of demographic information against known demographic information stored in, for example, a repository. For example, column detector 110 may cross-check an identified phone number and an identified facsimile number against known phone numbers and facsimile numbers to verify which is the phone number and which is the facsimile number. In some embodiments, column detector 110 may sequentially check the digits of the phone and facsimile numbers until column detector 110 determines that one of the two is a phone number. In some instances, only one of the two identified fields of demographic information may be known, e.g., the phone number, and column detector 110 may identify one of the two or more identified fields of demographic information, accordingly, with the remaining field of demographic information being identified as the most reasonable alternative (e.g., the facsimile number). Similarly, the column detector 110 may cross-check other pieces of demographic information, such as the NPI, service addresses, and billing addresses. It should be understood by those of ordinary skill in the arts that these are merely examples of the types of demographic information that may be cross-checked, and that other types of demographic information may be cross-checked in accordance with aspects of the present disclosure.

In some embodiments, the column detector 110 may analyze a limited number of rows of demographic information in the data file (i.e., less than the full number of rows in the data file) to improve the overall efficiency of the column detector 110. For example, after analyzing the semantic content, shape, and metadata of a number of rows, the column detector 110 may be able to identify the type of demographic information of each of the plurality of fields of demographic information, and assume that all remaining rows that have not been analyzed are the identified type of demographic information. Furthermore, the column detector 110 may generate the revised data file in smaller segments of rows, rather than the entire data file, which may require substantial amounts of resources, e.g., processing consumption and memory resources. By assuming the type of demographic information of the remaining rows, the column detector 110 reduces the overall amount of resources used and improves the efficiency of the server.

In this way, at step 204, column detector 110 may determine, based on the content of each column, a best possible label for the column.

In addition, at step 206, column detector 110 may determine a score $E_{ij}$ that for each column i the selected label j is correct. By summing or otherwise aggregating over each column i, a total evidence value $L_e$ supporting the chosen configuration of labels to columns is determined. The summation may be given by the equation:

$$L_e = \sum_i E_{i,j_i}$$

While this configuration may be accurate some of the time, it may be limited by label degeneracy, ambiguity, and missing data. According to embodiments, position frequency data may also be used to improve accuracy as described below.

At step 208, a score is determined for the label configuration determined in step 204 that takes into account the relative positions of each of the labels in the received data file. For respective first and second columns in the plurality of columns, a column score indicating a likelihood that the first column has its label selected at step 204 given that the second column has its label selected at step 204. For example, if one of the columns is labeled "First_Name," there may be a high likelihood that an adjacent column is labeled "Last_Name"

Figure 3:
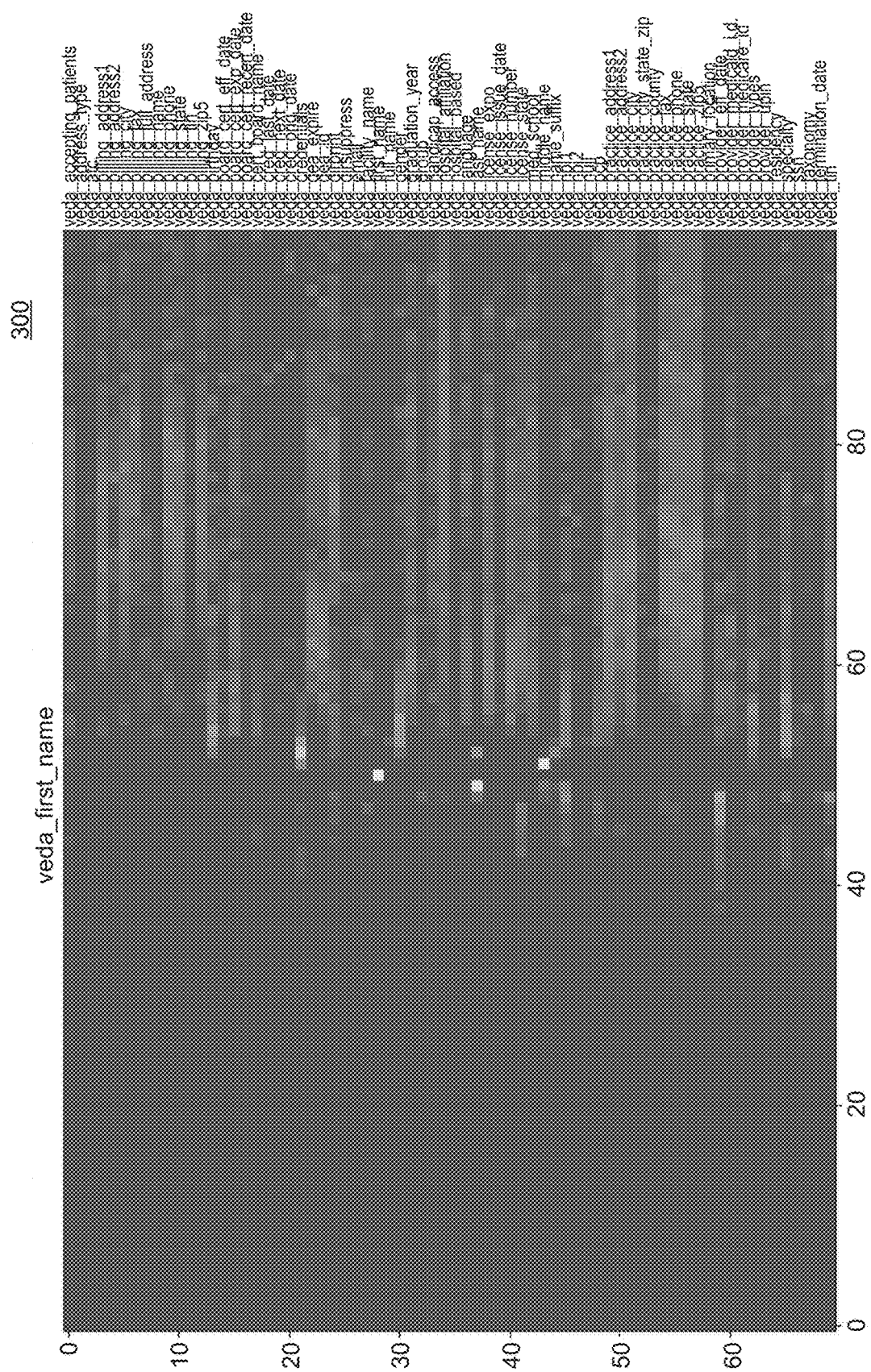
FIG. 3 illustrates an example position matrix according to an embodiment of the invention.

To determine the column score, column detector 110 may look up probability information in a matrix configured with historical data. The matrix is trained with historical data with columns that are either manually assigned or automatically assigned to have their labels confirmed for accuracy by a human. An example of such a matrix is illustrated as matrix 300 in FIG. 3. The matrix may simply identify the number of times, within a given sample set, label $c_1$ in label $c_2$ are offset by a number of columns d. In the example in FIG. 3, matrix 300 illustrates the number of times the label "veda_first_name" are offset by various labels listed on the right by the number of times listed below. The total count $N_d$ for all possible concepts and offsets is represented by a three-dimensional matrix $N_d(c_1, c_2, d)$.

The lookup determination $N_d(c_1, c_2, d)$ is made for the label at each column i and the label at each column offset d from column i. The total likelihood $L_p$ of any given configuration of labels for a particular data file in terms of positional arrangement is measured by using the sum (or other aggregation) of the respective matrix lookups:

$$L_p = \sum_{i,d} N_p(c_i, c_{(i+d)}, d),$$

where $c_{i+d}$ is the label selected for the (i+d)th column.

At step 210, a frequency score is determined. To determine the frequency score, for each pair of labels selected at step 204, a first frequency of a first label among the labels corresponding to the plurality of columns is determined. And, a second frequency of a second label among the labels corresponding to the plurality of columns is determined. Based on the first and second frequency scores, determining a frequency score indicating a likelihood that the first label occurs at the first frequency given that the second label occurs at the second frequency.

Figure 4:
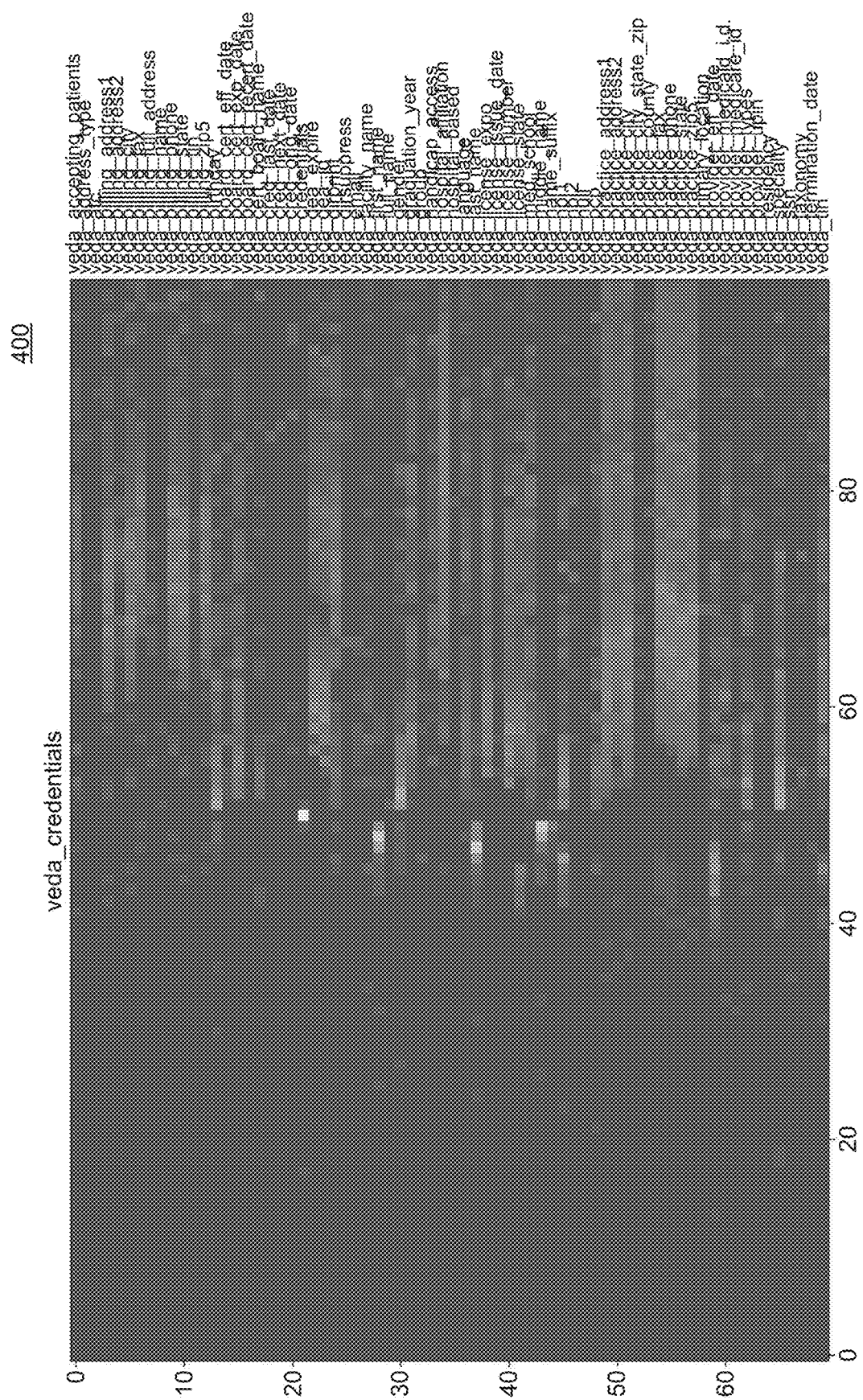
FIG. 4 illustrates an example frequency matrix according to an embodiment of the invention.

Like the determination in step 208, the frequency score determination can be done by looking up in a matrix the number of occurrences of that frequency in a given sample set. For example, given the fact that there are two "practice_address_line2" labels, there may be a high likelihood that there should also be two "practice_address_line1" labels. An example of a frequency matrix is illustrated as matrix 400 and FIG. 4.

The total likelihood $L_f$ of any configuration of labels for a data file in terms of frequency is measured using the sum (or other aggregation) of all historical accounts of frequency pairs in the data file:

$$L_j = \sum_{j,k \in J} N_f(c_j, n_j, c_k, n_k),$$

where J is the set of labels detected in step 204 for the file.

At step 212, an overall score is determined based on the content, position, and frequency likelihoods determined at step 206, 208, and 210. To determine the overall score for a given arrangement of labels-to-columns $L_{ij}$, a weighted sum or other aggregation may be done:

$$\mathcal{L}_{ij} = L_e + w_1 L_p + w_2 L_f,$$

where $w_1$ and $w_2$ are weights may be determined experimentally or during a training process.

At step 214 and 216, adjustments are made to the labels selected for each column in the process and repeated to optimize $L_{ij}$. For example, different labels may be swapped out or other changes may be made to steps 206-212, or these steps may be repeated to determine a new value $L_{ij}$ for the alternate arrangement. Different types of nonlinear optimization techniques may be used. For example, hill climbing, stochastic hill climbing, simulated, local beams search, genetic algorithms, or other known algorithms may be used to try to find an arrangement of labels to columns that provides a local or global optimum $L_{ij}$. After trying a number of variations without improving substantially $L_{ij}$, column detector 110 determines that a convergence has occurred and that set of labels is selected by column detector as the appropriate and best fitting set of labels for the columns in the data file.

Each of the servers and modules described above can be implemented in software, firmware, or hardware on a computing device. A computing device can include but is not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions in a non-transitory manner. Software may include one or more applications and an operating system. Hardware can include, but is not limited to, a processor, a memory, and a graphical user interface display.

The computing device may also have multiple processors and multiple shared or separate memory components. For example, the computing device may be a part of or the entirety of a clustered or distributed computing environment or server farm.

Figure 5:
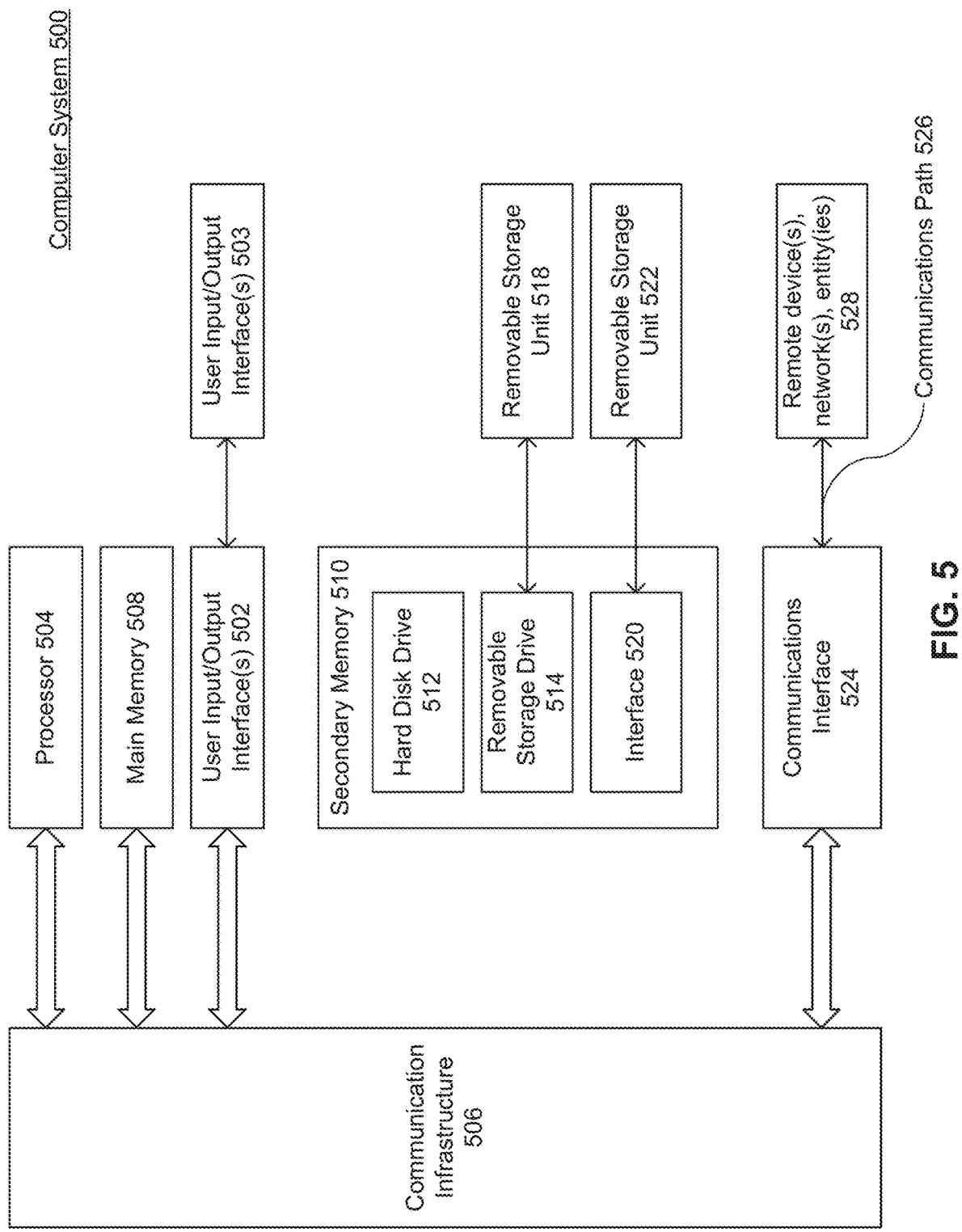
FIG. 5 illustrates an example computing device that can implement the invention.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), a comma-separated values (CSV), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system embodiments other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for determining which labels correspond to columns of a data file comprising columns and rows, the method comprising:
   receiving the data file containing a plurality of fields organized as a table with a plurality of columns and a plurality of rows, the data file having inconsistent labeling for the columns;
   training a model to detect a label based on data within the columns, wherein the model is trained using:
      a number of Monte Carlo training sets having sample data files, and
      rules for common types of demographic information;
   for respective columns in the plurality of columns, selecting, from a plurality of consistent labels, a label corresponding to the respective columns of the data file using the model to detect the label based on data within the column;
   for respective first and second columns in the plurality of columns, determining a column score indicating a likelihood that the first column has the label corresponding to the first column given that the second column has the label corresponding to the second column;
   determining, based on the column score, a placement score indicating a likelihood that labels from the plurality of consistent labels corresponding to the respective columns are correct, wherein for all of the labels the determining the placement score further comprises,
      determining a first frequency of a first label amongst the labels,
      determining a second frequency of a second label amongst the labels,
      determining a frequency score indicating a likelihood that the first label occurs at the first frequency given that the second label occurs at the second frequency, and
      determining the placement score based on the frequency score;
   adjusting the labels corresponding to each of the respective first and second columns based on the placement score;
   repeating, until the placement score converges, steps of:
      for the respective first and second columns in the plurality of columns, determining the column score indicating the likelihood that the first column has the label corresponding to the first column given that the second column has the label corresponding to the second column;
      determining, based on the column score, the placement score indicating the likelihood that the labels corresponding to the respective columns are correct, wherein for all of the labels, the determining the placement score further comprises:
         determining the first frequency of the first label amongst the labels,
         determining the second frequency of the second label amongst the labels,
         determining the frequency score indicating the likelihood that the first label occurs at the first frequency given that the second label occurs at the second frequency, and
         determining the placement score based on the frequency score; and
      adjusting the labels correspond to each of the respective first and second columns based on the placement score; and
   generating, by a column detector on a computing device, a reformatted data file based on the adjusted labels.

2. The method of claim 1, wherein the determining the frequency score comprises looking up a number of times the frequency score has shown up in a historical matrix.

3. The method of claim 1, further comprising repeating steps of:
   determining the first frequency of the first label among the labels,
   determining the second frequency of the second label among the labels, and
   determining the frequency score indicating the likelihood that the first label occurs at the first frequency given that the second label occurs at the second frequency,
   wherein the steps are repeated for respective columns in the plurality of columns to determine a plurality of frequency scores, and wherein the determining the placement score further comprises determining the placement score based on the plurality of frequency scores.

4. The method of claim 1, further comprising for respective columns in the plurality of columns, determining an evidence score indicating a likelihood that the label is correct, wherein the determining the placement score further comprises determining the placement score based on the evidence scores.

5. The method of claim 4, wherein the data file lists health care providers.

6. The method of claim 1, wherein the determining the placement score comprises looking up a number of times the placement score has shown up in a historical matrix.

7. The method of claim 1, wherein the data file stores demographic information.

8. A non-transitory computer-readable device having instructions stored thereon that, when executed by at least one computing device, cause the at least one computing device to perform operations for determining which labels correspond to columns of a data file comprising columns and rows, the operations comprising:
   receiving the data file containing a plurality of fields organized as a table with a plurality of columns and a plurality of rows, the data file having inconsistent labeling for the columns;
   training a model to detect a label based on data within the columns, wherein the model is trained using:

a number of Monte Carlo training sets having sample data files, and rules for common types of demographic information;

for respective columns in the plurality of columns, selecting, from a plurality of consistent labels, a label corresponding to the respective columns of the data file using the model to detect the label based on data within the column;

for respective first and second columns in the plurality of columns, determining a column score indicating a likelihood that the first column has the label corresponding to the first column given that the second column has the label corresponding to the second column;

determining, based on the column score, a placement score indicating a likelihood that labels from the plurality of consistent labels corresponding to the respective columns are correct, wherein for all of the labels, the operations further comprise:

determining a first frequency of a first label amongst the labels, determining a second frequency of a second label amongst the labels, determining a frequency score indicating a likelihood that the first label occurs at the first frequency given that the second label occurs at the second frequency, and determining the placement score based on the frequency score;

adjusting the labels corresponding to each of the respective columns based on the placement score;

repeating, until the placement score converges, steps of:

for the respective first and second columns in the plurality of columns, determining the column score indicating the likelihood that the first column has the label corresponding to the first column given that the second column has the label corresponding to the second column;

determining, based on the column score, the placement score indicating the likelihood that the labels corresponding to the respective columns are correct, wherein for all of the labels, the operations further comprise:

determining the first frequency of the first label amongst the labels, determining the second frequency of the second label amongst the labels, determining the frequency score indicating the likelihood that the first label occurs at the first frequency given that the second label occurs at the second frequency, and determining the placement score based on the frequency score; and adjusting the labels correspond to each of the respective first and second columns based on the placement score; and generating, by a column detector on the non-transitory computer-readable device, a reformatted data file based on the adjusted labels.

9. The non-transitory computer-readable device of claim 8, wherein the determining the frequency score comprises looking up a number of times the frequency score has shown up in a historical matrix.

10. The non-transitory computer-readable device of claim 8, wherein the operations further comprise repeating steps of:

determining the first frequency of the first label among the labels, determining the second frequency of the second label among the labels, and determining the frequency score indicating the likelihood that the first label occurs at the first frequency given that the second label occurs at the second frequency, wherein the steps are repeated for respective columns in the plurality of columns to determine a plurality of frequency scores, and wherein the determining the placement score further comprises determining the placement score based on the plurality of frequency scores.

11. The non-transitory computer-readable device of claim 8, wherein the operations further comprise for respective columns in the plurality of columns, determining an evidence score indicating a likelihood that the label is correct, wherein the determining the placement score further comprises determining the placement score based on the evidence scores.

12. The non-transitory computer-readable device of claim 8, wherein the determining the placement score comprises looking up the number of times the placement score has shown up in a historical matrix.

13. The non-transitory computer-readable device of claim 8, wherein the data file stores demographic information.

14. The non-transitory computer-readable device of claim 13, wherein the data file lists health care providers.

15. The non-transitory computer-readable device of claim 8, wherein the operations further comprise repeating, until an optima is found, the steps of:

for the respective first and second columns in the plurality of columns, determining the column score indicating the likelihood that the first column has the label corresponding to the first column given that the second column has the label corresponding to the second column, determining, based on the column score, the placement score indicating the likelihood that the labels corresponding to the respective columns are correct, and adjusting the labels corresponding to each of the respective first and second columns.

16. The non-transitory computer-readable device of claim 8, wherein the adjusting which of the labels correspond to each of the respective columns to obtain the reformatted data file comprises applying a nonlinear optimization technique.

17. The non-transitory computer-readable device of claim 16, wherein the nonlinear optimization technique includes at least one of hill climbing, stochastic hill climbing, simulated, local beams search, or genetic algorithms.

18. A system for determining which labels correspond to columns of a data file comprising columns and rows, comprising:

a processor; and a memory with instructions stored thereon that when executed by the processor, cause the processor to:

receive the data file containing a plurality of fields organized as a table with a plurality of columns and a plurality of rows, the data file having inconsistent labeling for the columns;

train a model to detect a label based on data within the columns, wherein the model is trained using:

a number of Monte Carlo training sets having sample data files, and rules for common types of demographic information;

for respective columns in the plurality of columns, select, from a plurality of consistent labels, a label corresponding to the respective columns of the data file using the model to detect the label based on data within the column;

for respective first and second columns in the plurality of columns, determine a column score indicating a likelihood that the first column has the label corresponding to the first column given that the second column has the label corresponding to the second column;

determine, based on the column score, a placement score indicating a likelihood that labels from the plurality of consistent labels corresponding to the respective columns are correct, wherein for all of the labels, the instructions further cause the processor to:
   determine a first frequency of a first label amongst the labels,
   determine a second frequency of a second label amongst the labels,
   determine a frequency score indicating a likelihood that the first label occurs at the first frequency given that the second label occurs at the second frequency, and
   determine the placement score based on the frequency score;

adjust the labels corresponding to each of the respective columns based on the placement score;

repeat, until the placement score converges, steps of:
   for the respective first and second columns in the plurality of columns, determine the column score indicating the likelihood that the first column has the label corresponding to the first column given that the second column has the label corresponding to the second column;
   determine, based on the column score, the placement score indicating the likelihood that the labels corresponding to the respective columns are correct, wherein for all of the labels, the instructions further cause the processor to:
      determine the first frequency of the first label amongst the labels,
      determine the second frequency of the second label amongst the labels,
      determine the frequency score indicating the likelihood that the first label occurs at the first frequency given that the second label occurs at the second frequency, and
      determine the placement score based on the frequency score; and
   adjust the labels correspond to each of the respective first and second columns based on the placement score; and generate, by a column detector on the system, a reformatted data file based on the adjusted labels.

* * * * *